Dec. 17, 1940.  I. N. OGLEVEE  2,225,179
MAGNETIC TESTING OF TURBINE BLADES
Filed Feb. 27, 1937  2 Sheets-Sheet 1
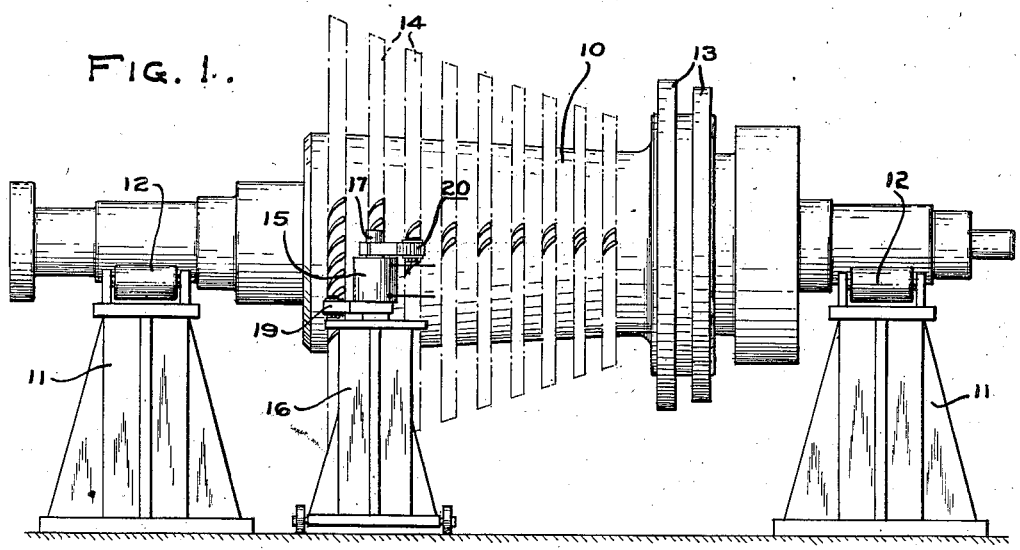
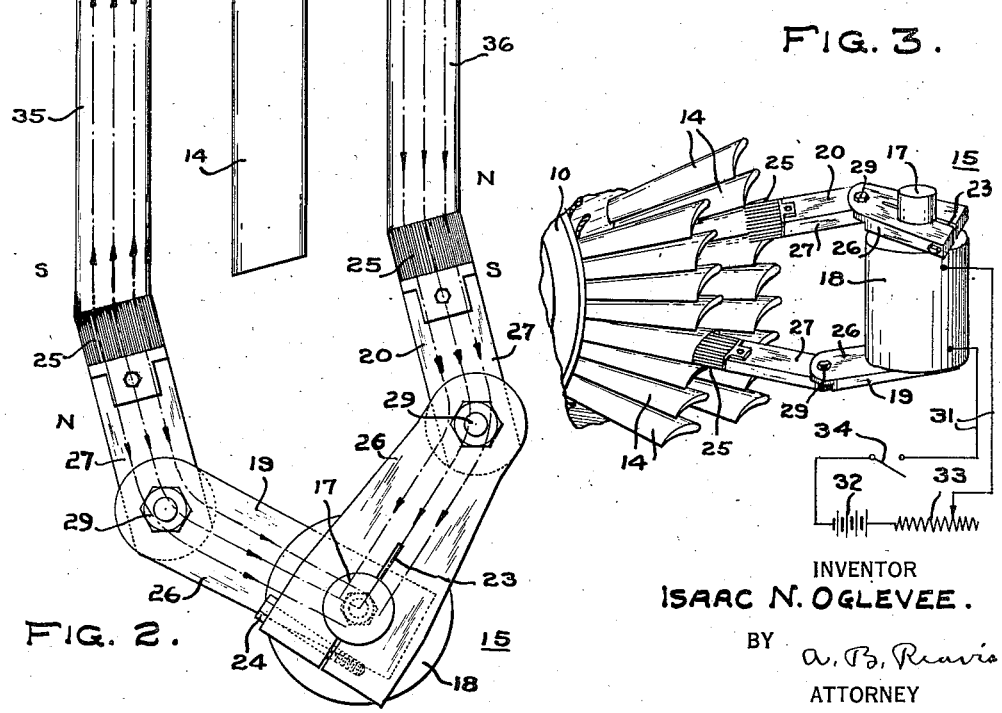
INVENTOR
ISAAC N. OGLEVEE.
BY a. B. Reavis
ATTORNEY

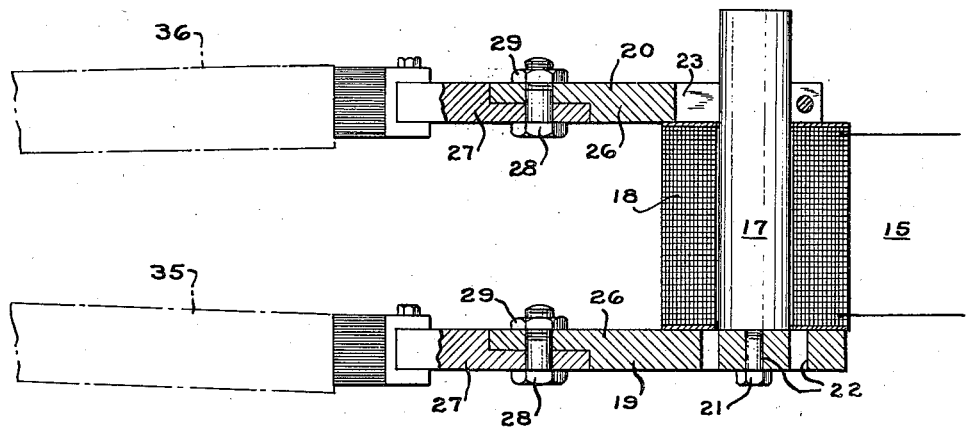
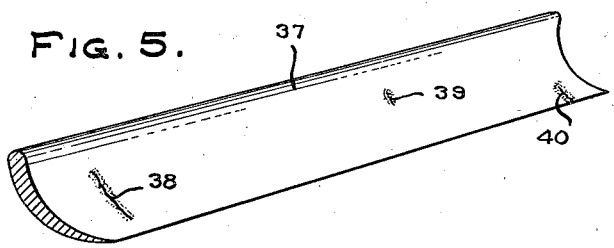
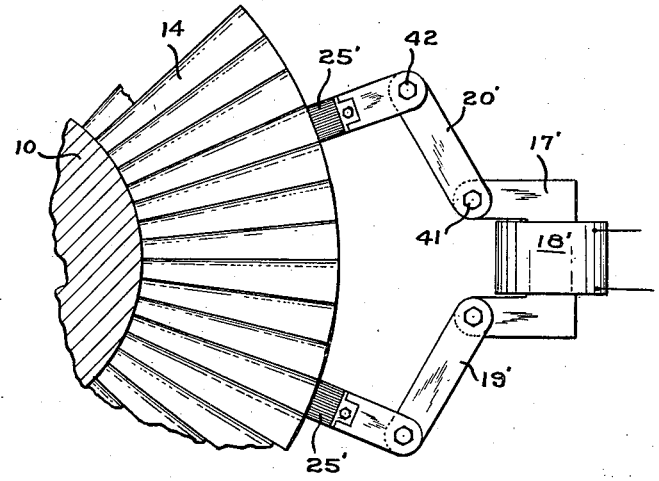

Patented Dec. 17, 1940

2,225,179

UNITED STATES PATENT OFFICE 2,225,179

MAGNETIC TESTING OF TURBINE BLADES

Isaac N. Oglevee, Prospect Park, Pa., assignor, by mesne assignments, to Magnaflux Corporation, a corporation of Delaware Application February 27, 1937, Serial No. 128,061

7 Claims. (Cl. 175—183)

My invention relates to a method of detecting cracks, flaws or other imperfections in the blades of a turbine rotor or stator by distributing fine particles of paramagnetic or magnetizable material in the region surrounding the blades while the latter are magnetized, and it relates more particularly to the step of magnetizing the blades mounted on a turbine rotor or stator.

A general object of the invention is to provide an improved method of the character set forth.

Another object is to magnetize the blades conveniently and quickly.

Another object is to avoid magnetizing the blades too strongly, thereby avoiding objectionable residual magnetism after the inspection of the blades is completed.

According to the preferred manner of carrying out my invention, one pole of a magnetizing device is brought into contact with the outer end of one or more blades in one row and the other pole is brought into contact with the outer end of one or more blades in another row nearby, thereby magnetizing the blades in contact with said poles. Fine particles of paramagnetic material are sprinkled in the region surrounding the magnetized blades to detect cracks or other imperfections. The rotor is then rotated to bring the outer ends of the successive blades of the respective rows into contact with the poles of the magnetizing device for magnetizing and inspecting them in the same manner. The remaining blades of the two rows and the remaining rows of blades are similarly inspected. Alternatively, all the blades of the two rows may be magnetized and the paramagnetic material then sprinkled over the blades, utilizing the residual magnetism of the blades. In this case, however, a greater magnetizing force is required and it may also be necessary to de-magnetize the blades.

I also prefer to magnetize at one time blades in two rows spaced by at least one intermediate row, in order to minimize the stray magnetic field extending directly across the outer ends of the magnetized blades.

The above recited and other objects are effected by my invention as will be apparent from the following description and claims taken in connection with the accompanying drawings, forming a part of this application in which:

Fig. 1 is a side elevation of a turbine rotor mounted on pedestals and the magnetizing device in position;

Fig. 2 is a plan view of the magnetizing device applied to blades in two rows spaced from each other by an intermediate row;

Fig. 3 is a perspective view of the magnetizing device applied to blades in two adjacent rows;

Fig. 4 is a vertical section through the magnetizing device;

Fig. 5 is a perspective of a blade having concentrations of iron filings indicating cracks; and, Fig. 6 is an end view of a turbine rotor and a modified form of magnetizing device.

Referring now to the drawings in detail, I show in Fig. 1 a turbine rotor 10 removed from the casing or stator and mounted on pedestals 11 having rollers 12 whereby the rotor may be rotated. The rotor has two rows of impulse blades 13 and a greater number of rows of reaction blades 14, all of which may be inspected by the present method.

The magnetizing device 15 is shown mounted on a pedestal 16 in position for magnetizing two rows of blades adjacent the low pressure end. The magnetizing device is shown more clearly in Figs. 2, 3 and 4. It includes a core 17 extending through a coil 18, and pole pieces 19 and 20 connected to opposite ends of the core 17. The pole piece 19 abuts the lower end of the core and is attached thereto by a screw 21 extending through an opening 22 formed in the pole pieces. A plurality of such openings 22 may be provided to permit adjustment of the core longitudinally of the pole piece. The pole piece 20 has an opening through which the round upper end of the core projects and is adjustable lengthwise of the core. It has a slot 23 dividing the end thereof into two jaws, and a bolt 24 is provided for clamping the jaws together with the core therebetween. At the opposite ends, the pole pieces are provided with brushes 25 made of magnetic material. Each pole piece is preferably made in two parts 26 and 27, which are pivoted by means of bolts 28 and nuts 29, to provide for angular adjustability.

The coil 18 is connected through a circuit 31 with a suitable source of electric current, preferably direct current represented diagrammatically as a battery 32. The circuit 31 is provided with a rheostat 33 for regulating the value of the current and a switch 34 for turning the current on and off.

Operation

The turbine rotor 10 is mounted on the pedestals 11 as shown in Fig. 1. The magnetizing device 15 is mounted on the pedestal 16 and the pole pieces are adjusted as shown in Fig. 2 so that the outer ends of the brushes 25 are flush against the outer ends of blades in two different rows. Preferably, the pole pieces are adjusted so as to contact two rows spaced by an intermediate row. For example, as shown in Fig. 2 the pole piece 19 is disposed to magnetize the blades of the first row 35, counting from the left hand or low pressure end of the rotor, and the pole piece 20 is adjusted to magnetize blades in the third row 36. The purpose of this spacing is to reduce the stray field that extends between the outer ends of the magnetized blades.

The switch 34 is then closed to energize the coil 18, whereupon the blades whose outer ends contact with the brushes 25 are magnetized. These brushes may be wide enough to contact two or more blades. In Fig. 2 the pole pieces 19 and 20 are north and south poles, respectively, so that the blades 35 become south poles and the blades 36 become north poles. The lines of flux extend longitudinally through the respective blades and through the turbine rotor between the blades.

The inspection of the magnetized blades then continues in substantially the same way in which inspection of paramagnetic particles has been carried on for some time. Suitable paramagnetic or magnetizable material, in the form of fine particles, is sprinkled over the surfaces of the magnetized blades or otherwise distributed through the region surrounding said blades. Several suitable forms of such paramagnetic material are already well known in the art. These particles collect on the surface of the blades wherever there is any crack, flaw or other imperfection in the metal of the blade that offers increased reluctance to magnetic flux, even though such imperfections may be entirely below the surface. In Fig. 5, I show a turbine blade 37 having cracks 38, 39 and 40 therein. As will be seen from this figure, the particles of the paramagnetic material are concentrated along the extent of these cracks so as to provide a visual indication thereof.

The present method is particularly suitable for locating cracks extending transversely of the blades or at least having a component transversely of the blades. Such cracks are indicated for the reason that they traverse the lines of magnetic flux within the blade, which, as above mentioned, extend longitudinally of the blades. In the art of turbines, transverse cracks are of primary concern for the reason that the main force to be dealt with is centrifugal force which extends longitudinally of the blades. However, to locate longitudinal cracks, an electric circuit may be passed through the blades in substantially the same way in which I provide a magnetic circuit through the blades, that is, by contacting the outer ends of two different blades. The provision of such an electric circuit provides circumferential lines of magnetic flux, thereby revealing longitudinal cracks, as more fully explained in Reissue Patent 19,611 of A. V. De Forest.

After the blades thus magnetized have been inspected, the turbine rotor is turned sufficiently to bring the succeeding blades of the respective rows into contact with the brushes 25 of the pole pieces. These blades are similarly inspected, as are the remaining blades upon bringing them successively into contact with the pole pieces. After inspection of these two rows of blades, the blades of the remaining rows are inspected in the same manner.

In Fig. 6, I show a somewhat modified form of magnetizing device comprising a coil 18', a U-shaped core member 17' and pole pieces 19', and 20'. In this case, the pole pieces are each pivoted at two places, indicated at 41 and 42, respectively. As shown in this figure the brushes 25' are brought into contact with the outer ends of different blades in the same row. The blades are inspected while thus magnetized, in the same manner mentioned above.

I prefer to inspect the blades while the magnetic force of the magnetizing device is applied thereto, inasmuch as a magnetizing force of considerably lower magnitude may be employed, and the residual magnetism is considerably less. However, if preferred, two entire rows of blades may be magnetized and the blades then inspected by means of the residual magnetism. In this case, the poles of the magnetizing device should contact blades in different rows, as in Figs. 1, 2, and 3, so that all the blades of a row may be of the same pole of magnetization.

It will be apparent that the blades of a turbine casing may be inspected in substantially the same manner, that is, by bringing the pole pieces of a magnetizing device into contact with the outer ends of different blades.

While I have shown my invention in several forms, it will be obvious to those skilled in the art that it is not so limited, but is susceptible if various other changes and modifications without departing from the spirit thereof, and I desire, therefore, that only such limitations shall be placed thereupon as are imposed by the prior art or as are specifically set forth in the appended claims.

What I claim is:

1. The method of detecting cracks or other imperfections in the blades of a turbine element having a plurality of blades mounted thereon comprising bringing one pole of a magnetizing device into proximity with the free end of one blade on said turbine element and the other pole into proximity with the free end of another blade on said turbine element for completing a magnetic circuit through said blades and the turbine element, and bringing finely divided paramagnetic particles sufficiently close to said magnetized blades to adhere thereto adjacent any crack or other imperfection providing thereat increased reductance to magnetic flux.

2. The method of detecting cracks or other imperfections in the blades of a turbine element having one or more rows of blades mounted thereon comprising bringing one pole of a magnetizing device into proximity with the free end of one of said blades on said turbine element and the other pole into proximity with the free end of another of said blades on said turbine element for completing a magnetic circuit through said blades and the turbine element, effecting relative rotative movement between said magnetizing device and said turbine element to bring the outer ends of different blades on said turbine element successively adjacent said poles for successively magnetizing said blades, and bringing fine particles of paramagnetic material adjacent the surfaces of the blades as they are magnetized to adhere thereto at any crack or imperfection providing thereat increased reductance to magnetic flux.

3. The method of detecting cracks or other imperfections in the blades of a turbine element having a plurality of rows of blades mounted thereon comprising bringing one pole of a magnetizing device into proximity with the free end of a blade in one row and bringing the other pole of the device in proximity with a blade in another row to magnetize said blades, effecting relative rotative movement between the magnetizing device and the turbine element to bring the outer ends of the blades in said rows successively adjacent said poles for successively magnetizing said blades, and bringing fine particles of paramagnetic material sufficiently close to said magnetized blades to adhere to the surface thereof adjacent any crack or other imperfection providing thereat increased reluctance to magnetic flux.

4. The method of detecting cracks or other imperfections in the blades of a turbine element having a plurality of rows of blades mounted thereon comprising placing one pole of a magnetizing device adjacent the outer end of a blade in one row and the other pole adjacent the outer end of a blade in another row spaced from said one row by at least one intermediate row, for magnetizing the blades adjacent said poles, effecting relative rotative movement of said magnetizing device and said turbine element about the axis of the turbine element, and distributing fine particles of paramagnetic material over the magnetized blades to adhere to the surface thereof at any crack or other imperfection providing thereat increased reluctance to magnetic flux.

5. The method of testing the blades of a turbine rotor for cracks or other imperfections comprising rotatably mounting said rotor, placing one pole of a magnet adjacent the periphery of one blade row and the other pole adjacent the periphery of another row, rotating said rotor to bring the outer ends of the blades in said rows successively adjacent said poles for successively magnetizing said blades, and bringing fine particles of paramagnetic material adjacent the surfaces of the magnetized blades to adhere thereto at any crack or other imperfection providing thereat increased reluctance to magnetic flux.

6. The method of detecting cracks or other imperfections in the blades of a turbine element having a row or rows of blades mounted thereon comprising bringing one pole of a magnetizing device adjacent the periphery of one blade row and bringing the other pole adjacent another portion of the turbine element such that a magnetic circuit through a blade or blades in said one row is effected, effecting relative rotative movement between said magnetizing device and said turbine element, and bringing finely divided paramagnetic particles sufficiently close to said magnetized blades to adhere thereto adjacent any crack or other imperfection providing thereat increased reluctance to magnetic flux.

7. The method of detecting cracks or other imperfections in the blades of a turbine element having a plurality of blades mounted thereon, which method comprises bringing a magnetizing device adjacent the free ends only of said blades for completing a magnetic circuit through said blades and the turbine element and bringing finely divided paramagnetic particles sufficiently close to said magnetized blades to adhere thereto adjacent any crack or other imperfection providing thereat increased reluctance to magnetic flux.

ISAAC N. OGLEVEE.